(12) United States Patent
Lally

(10) Patent No.: US 8,268,062 B2
(45) Date of Patent: Sep. 18, 2012

(54) COATING AND METHOD FOR PRODUCING RESISTANT AND INSULATED PIPELINE STRUCTURES

(76) Inventor: Thomas J. Lally, Oak Brook, IL (US)

( * ) Notice: Subject to any disclaimer, the term of this patent is extended or adjusted under 35 U.S.C. 154(b) by 828 days.

(21) Appl. No.: 12/286,259

(22) Filed: Sep. 29, 2008

(65) Prior Publication Data

US 2009/0042022 A1 Feb. 12, 2009

Related U.S. Application Data

(60) Continuation-in-part of application No. 11/156,395, filed on Jun. 20, 2005, now Pat. No. 7,429,290, which is a continuation-in-part of application No. 10/818,268, filed on Apr. 5, 2004, now abandoned, which is a continuation-in-part of application No. 10/338,425, filed on Jan. 8, 2003, now Pat. No. 6,787,495, which is a division of application No. 09/602,067, filed on Jun. 22, 2000, now Pat. No. 6,533,821.

(51) Int. Cl.
*B05D 1/36* (2006.01)
*B32B 5/00* (2006.01)
*C09K 21/12* (2006.01)

(52) U.S. Cl. .................. 106/18.12; 106/18.14; 252/601; 252/607; 427/408; 427/419.6; 427/409; 427/419.2; 427/407.1; 428/332

(58) Field of Classification Search ............... 106/18.12, 106/18.14; 252/601, 607; 427/408, 419.6, 427/409, 419.2, 407.1; 423/332
See application file for complete search history.

(56) References Cited

U.S. PATENT DOCUMENTS

| 2002/0066491 A1* | 6/2002 | Lively | 138/149 |
| 2005/0229809 A1* | 10/2005 | Lally | 106/18.14 |

* cited by examiner

*Primary Examiner* — Elizabeth Wood

(57) ABSTRACT

The present invention relates to a fire-retardant material and method. More specifically, the present invention relates to an insulating, fire-retardant coating (and method) that shields underlying substrates from thermal and other types of insult. The invented coating is especially applicable to energy transport means including oil pipelines. The invented coating and method is also useful in providing a insulating and fire-resistant coating for a variety of substrates including but not limited to: concrete, metals, foamed polymeric materials (i.e. styrofoam), gypsum, synthetics and other substrates.

13 Claims, No Drawings

COATING AND METHOD FOR PRODUCING RESISTANT AND INSULATED PIPELINE STRUCTURES

RELATED PATENT APPLICATIONS

The present invention is a Continuation-In-Part Application of, and claims priority to U.S. patent application Ser. No. 11/156,395, filed Jun. 20, 2005 now U.S. Pat. No. 7,429,290, by instant inventor, which is a Continuation-In-Part Application of, and claims priority to, U.S. patent application Ser. No. 10/818,268 filed Apr. 5, 2004, by instant inventor now abandoned, which is a Continuation-In-Part Application of, and claims priority to, U.S. patent application Ser. No. 10/338, 425 filed Jan. 8, 2003 by instant inventor now U.S. Pat. No. 6,787,495, which in turn is a Divisional Application of, and claims priority to, U.S. patent application Ser. No. 09/602, 067, filed on Jun. 22, 2000, now U.S. Pat. No. 6,533,821, issued on Mar. 18, 2003, and any other applications and/or patents in this line, all of which are hereby incorporated by reference in their entirety.

TECHNICAL FIELD

The present invention relates to a fire-retardant material and method. More specifically, the present invention relates to an insulating, fire-retardant coating (and method) that shields underlying substrates from thermal and other types of insult. The invented coating is especially applicable to energy transport means including oil pipelines. The invented coating and method is also useful in providing a insulating and fire-resistant coating for a variety of substrates including but not limited to: concrete, metals, foamed polymeric materials (i.e. styrofoam), gypsum, synthetics and other substrates.

BACKGROUND ART

Protecting energy transport means and structures such as oil and gas pipelines requires coatings that can withstand the most severe conditions. Energy pipelines run though a vast array of different environments ranging from demanding subsurface environs to the harsh conditions of the arctic. Pipelines must also contend with potentially challenging conditions resulting from the dangerous contents flowing through their networks.

A number of coatings have been developed over the years to protect to reduce the flammability of energy pipelines and other substrates demanding high performance coatings. However, too often these coating methods are inadequate at providing fire-retardancy or insulation, are too expensive, or have some other shortcoming. A need exists for a cost effective coating and method.

A need exists for fire-retardant coating for energy pipelines that is cost effective and which provides superior fire-retardancy and insulation.

The coating described herein can also be used as a multi-purpose coating and can be utilized on a wide variety of substrates.

SUMMARY OF THE INVENTION

The present invention relates to a fire-resistant coating and method thereof, which confers enhanced insulating and flame/heat resistance to various substrates and materials. Exemplary materials include steel, various ferrous and non-ferrous metals, woods, gypsums, composites of wood and cellulose, concrete, mortars, and synthetic products, including plastics, paper and carbon composites. The present invention is especially well suited for coating energy pipelines, and building materials.

The invented coating comprises: at least one insulating layer and at least one multi-purpose fire-retardant layer. The insulating layer is preferably comprised of a Ceramic Cover 100 ("CC-100") manufactured by Therm-Cote, Inc. of Atlanta, Ga.; Therma-Coat manufactured by Hempel Coatings, Conroe, Tex., suitable equivalents and replacements and combinations thereof. The at least one fire-retardant layer generally comprises: a potassium phosphate, a metal oxide, an insulative glass, a metal silicate and/or tri-calcium phosphate, and an aqueous solution. A preferred fire-retardant layer is composed of Therm-Mack manufactured by the Bindan Corporation, Oak Brook, Ill.

The present invention provides a light-weight formulation to coat building materials. A feature of the formulation is that it thermally insulates pipelines, building materials, and other substrates from fluids having high temperatures. An advantage of the insulating layer(s) is that it provides superior insulative values with only a thin coat. An advantage of at least one embodiment of the fire-retardant layer is that it provides superior thermal and flame protection, (as well as structural strength) at a cost effective price and with use of a very thin coating.

An advantage of one embodiment of the present invention is to provide an insulative layer as well as a ceramic-based fire-retardant coating which can be use to impart thermal, insulative and structural integrity to an underlying substrate. A feature of one embodiment of the ceramic-based film is its ability to impart structural rigidity to the substrate while also increasing heat and flame resistance.

As described in inventor Lally's previous patents and patent applications and like other compositions developed by the instant inventor, the present fire-retardant coating includes a multi-purpose matrix that can be used in a variety of ways including but not limited to: a coating, binder, adhesive, cement, mortar, underlayment and patching material. A myriad of aggregates and additives can be added to the ceramic matrix composition to create various products including, but not limited to: tile, sculpture, terrazzo, refractories, under-layments, flooring, siding, roofing, countertops, overlayment, patching material, environmental materials, safety tiles, architectural products, building materials, fire-resistant protectants, pervious concrete and cement, toxic and environmental remediation products, panels, and medical and dental applications.

The invented multi-layer coating system described herein can also be employed for a myriad of different uses, on countless numbers of substrates and a wide range of environs.

DETAILED DESCRIPTION OF THE PREFERRED EMBODIMENTS

The invented coating system of one preferred embodiment of the invention generally comprises: at least one insulative coating and at least one multi-purpose coating.

The invented coating can be applied using the following method.

1. Optionally applying one or more primers or other layers;
2. Applying at least one layer of insulative material (i.e. CC-100) to the surface of a substrate, creating a coated substrate;
3. Optionally applying one or more layers between the insulative layer(s) and the multi-purpose layer(s);
4. Applying at least one layer of multi-purpose fire-retardant coating on top of the coated substrate; and 5. Optionally applying one or more additional layers.

It should be noted that it may be helpful to dry each layer before applying a successive layer. For example, it may be helpful to dry the insulative material between application of multiple layers insulation and between applications of insulative material and the multi-purpose coating and/or other coatings. Other layers on top, below or between the first insulative and first multi-purpose coating is envisioned and can be employed.

Insulative Coating

The insulative coating may include Ceramic-Cover, 100 (CC-100), manufactured by Therma-Cote, Inc. of Atlanta, Ga.; Therma-Coat coating manufactured by Hempel Coatings, an other similar or equivalent coatings, and/or combinations thereof. CC-100 is the preferred coating. Alternate insulative coatings known in the art may also be employed. CC-100 and Therma-Coat being preferred. The coating can be applied in a number of ways known in the art including but not limited to: spraying, rolling, brushing, dripping, painting, trolling, and dip coating.

Multi-Purpose Fire-Retardant Coating

One preferred formulation of the multi-purpose, fire-retardant coating is composed of a potassium phosphate, a metal oxide, at least one silica containing compound (i.e. glass), calcium silicate and/or tri-calcium phosphate, and an aqueous solution. A preferred fire-retardant layer is composed of Therm-Mack manufactured by the Bindan Corporation, Oak Brook, Ill. The following is an exemplary formulation.

Formula I

| | |
|---|---|
| $KH_2PO_4$ ("MKP") | 27 weight percent of the dry mixture |
| MgO | 20 weight percent of the dry mixture |
| Crushed pyrex or E-glass | 33 weight percent of the dry mixture |
| Calcium containing compounds (i.e. $CaSiO_3$ or TCP) | 20 weight percent of the dry mixture |

Water is added at between about 15 and 55 weight percent of the dry mixture. Preferably water is added at approximately 25 weight percent of the dry mixture.

The MKP, MgO, a silica containing compound (i.e. crushed glass), and at least one metal silicate ($CaSiO_3$) (and/or tricalcium phosphate), are mixed together in powder form to create a homogeneous dry mixture. Obtaining a homogenous dry mixture can be accomplished through a number of techniques well known in the art including but not limited to hand, machine or ribbon mixing. See, U.S. patent application Ser. No. 09/602,067, now U.S. Pat. No. 6,533,821 filed by instant inventor on Jun. 22, 2000, and incorporated herein by reference in its entirety. Although dry components are preferred, other forms of the components may be utilized.

The dry mixture is mixed with an aqueous solution (i.e. water) to form a slurry. In Formulation I, water is generally added at 15-35 weight percent of the dry mixture, preferably at about 25 weigh percent. However, water can be added at various percentages, preferably between 15 and 55 weight percent of the dry mixture. Water can be supplemented or replaced by various aqueous solutions including but not limited to: phosphoric acid, acid solutions and solutions containing phosphoric acid salts or equivalents.

The slurry is mixed until a homogeneous slurry is obtained. Suitable mixing times for most applications are between 30 seconds and 10 minutes, although shorter and/or longer mixing times can be used as long as a good mixture is obtained.

Mixing can be achieved using several techniques well known in the art including but not limited to mixing by hand, using an electronic hand mixer or commercial mixer. The slurry is generally produced at the user site.

Alternatively, the dry mixture and water can be mixed using various spray technologies where the water and dry mixture are mixed prior to, or after release from the spraying apparatus. Other mixing techniques and composition preparations can also be envisioned. In addition to a sprayable form, various other forms of the composition can be created including but not limited to cementious forms and puddies. The form of the material can be manipulated in a variety of ways including varying the amount of water. It is preferred to mix the components before spraying.

The reactivity and pot life of the slurry can be controlled by the addition of various setting regulators. Suitable setting retarders include but are not limited to: boric acid and other known setting retarders.

A variety of known setting accelerators can also be employed, including but not limited to: phosphoric acids, and acid solutions containing phosphate salts. Pot life can also be controlled by other techniques known in the art such as controlling the particle size, substitution of less reactive or more reactive components and temperature of the reactants.

As noted, the temperature of the aqueous solution and other components can be used to regulate reactivity and pot life. The temperature of the water is related to the mixture's reactivity, thus the rate of the reaction can be controlled to some degree by the temperature of the water (or other solution) being added. Hot water tends to speed up the reaction while cool water tends to slow it down. The temperature of the reagents, like that of water, affects the reactivity of the slurry. Hotter reagents tend to speed up the reaction while cool reagents tend to slow it down.

While the above-mentioned formulation and weight percents are the most preferred proportions, a range of the constituents can also used.

The following weight percents are based on the weight of the combined dry mixture. In one embodiment exemplary ranges include but are not limited to: generally between about 15-45 weight percent mono potassium phosphate ("MKP"), preferably approximately 2045 weight percent MKP, even more preferably approximately 20-30 weight percent. The potasium phosphate may be added up to about 60 (or even about 70 weight) percent of the dry mixture.

The MgO (metal oxide) can also be utilized in varying weight percents. The metal oxide may be generally added at between 5 and 50 weight percent. One preferred range of the metal oxide is between approximately 5 and 35 weight percent, more preferably between approximately 10-25 weight percent, even more preferably approximately 15-25 weight percent.

The silica containing compound should generally be present at between approximately 5-45 weight percent, (15-45) preferably at approximately 20-40 weight percent, even more preferably at approximately 30-40 weight percent. The silica containing compound is preferably added at a weight of 15 weight percent or greater to enhance the fire-protection and increase the adhesive ability of the fire coating. Using less silica (1-25 weight percent) is envisioned for certain applications.

An exemplary range for the silicate(s) is between about 1-45 weight percent, preferably between about 5-20 weight percent, more preferably between about 10 and 20.

Percentages may vary when various fillers, additives and/or aggregates are added or as conditions or desired results change.

The reaction between the metal oxide and phosphate is salient feature of the invention. Increasing the percentage of metal oxide (i.e. MgO), especially in relation to the phosphate (i.e. MKP) generally tends to increase the speed of the reaction and decrease pot life. Reducing the amount of metal oxide has the opposite effect.

A salient aspect of the invention is the weight ratio of the potassium phosphate (i.e. MKP) to metal oxide (i.e. MgO). A suitable ratio between MKP and MgO is between 0.5:1 and 4:1, more preferably in a ratio between 1:1 and 3:1, even more preferably at a weight ratio of approximately 2:1. This weight ratio is important as compositions having a weight ratio less than 0.5:1 (i.e. between MKP and MgO) have very short setting times and high setting temperatures. Composition having weight ratios above 4:1 (i.e. between MKP and MgO) tend to react very slowly and have lower compressive strength and possibly less adhesive ability.

It may be possible to use ratio outside these guidelines using various setting agents and or additives, or by manipulating the composition with the addition of various metal salts, carbonates, sulfates and equivalents, especially those containing K and/or Mg.

Multi-Purpose Dry Mixture Components

One salient feature of the present invention is a metal oxide, preferably MgO. i Another salient feature of the present composition is a phosphate compound, preferably a potassium phosphate, more preferably mono potassium phosphate ("MKP"). Other phosphates include but are not limited to: phosphoric acid, and phosphoric acid salts.

The addition of a silica containing compound is an important aspect of the invention. The silica containing compound can be selected from a variety of silica containing compounds known in the art. The silica containing material is preferably crushed E-glass or pyrex, or crushed E-glass or pyrex glass powder.

Other suitable silica containing compounds including but not limited to: silica fume, rice hull ash, granite dust, glasses, silica powder, kyanite, mullite, sand, clay, cenospheres, bauxite, and mixtures thereof can also be employed in addition to, or in place of, the crushed glass.

The addition of a metal silicate to the dry mixture enhanced the fire and flame retardancy of the final product. Suitable silicates can be used including: alkali metal and alkali earth metal silicates, aluminum silicate, alumina silicate, calcium silicate, magnesium silicates, talc, olivine, equivalents and combinations thereof. The silicate is believed to significantly enhances the fire-retardancy and adhesion of the invented material and is a salient aspect of the invention.

The metal silicate of the present invention is preferably $CaSiO_3$ An exemplary calcium silicate is VANSIL. RTM. W-10 from R.T. Vanderbilt Company (Norwalk, Conn.). The addition of calcium containing compounds such as calcium silicate sometimes cause the slurry to coagulate. To minimize coagulation various known flow agents can be added. The flow agents are generally added at between approximately 1-10 percent, although this range is merely exemplary.

A number of other components and/or additives may be added to the composition including but not limited to: perlite, rice hull ash, wool fibers, vermiculite, ceramic fibers and combinations thereof.

Although, dry components are disclosed, a variety of forms of the components can be envisioned and may be employed.

| Formulation II | |
|---|---|
| $KH_2PO_4$ ("MKP") | 35 weight percent of the dry mixture |
| MgO | 17 weight percent of the dry mixture |
| Silica containing compound(s) (i.e. crushed glass) | 35 weight percent of the dry mixture |
| Metal Silicates(s) (i.e. $CaSiO_3$ and/or TCP) | 13 weight percent of the dry mixture |

Water is added at between about 15 and 55 weight percent of the dry mixture. Preferably water is added at approximately 25 weight percent of the dry mixture.

| Formulation III | |
|---|---|
| MKP | 40 weight percent of the dry mixture |
| MgO | 35 weight percent of the dry mixture |
| $SiO_2$ | 20 weight percent of the dry mixture |
| $CaSiO_3$ | 5 weight percent of the dry mixture |

Water is added at between about 15 and 55 weight percent of the dry mixture. Preferably water is added at approximately 25 weight percent of the dry mixture.

| Formulation IV | |
|---|---|
| MKP | 35 weight percent of the dry mixture |
| MgO | 17 weight percent of the dry mixture |
| $SiO_2$ | 27 weight percent of the dry mixture |
| $CaSiO_3$ | 7 weight percent of the dry mixture |
| Rice Hull Ash | 8 weight percent of the dry mixture |
| Olivine | 6 weight percent of the dry mixture |

Water is added at between about 15 and 55 weight percent of the dry mixture. Preferably water is added at approximately 25 weight percent of the dry mixture. Olivine was added to improve the flowability of the mixture.

It was found that addition of a boric acid solution in the amount of up to a few percent, preferably around 0.25%-1.00%, may be added to increase the pot life of the slurry.

The boric acid solution is preferably comprised of: boric acid and a sugar (i.e. table sugar) or other sugar, sugar derivative, related substance or combination thereof. The weight percent ratio between the boric acid and sugar is suitably between 1:4 and 4:1, preferably between 2:1 and 1:2, more preferably at a ratio of approximately 1:1. The boric acid/sugar mixture has been developed by inventor as a cost effective, easy to use, multi-purpose retarder.

It was also found that silicates could supplemented or substituted by a calcium phosphate, derivative or equivalent, preferably a tri-calcium phosphate compound. Suitable tri-calcium phosphates include but are not limited to alpha and beta tricalcium phosphate and hydroxyapatite.

A preferred tri-calcium phosphate compound is a tri-calcium phosphate (TCP) sold by Astaris (St. Louis, Mo.). An exemplary formulation of this embodiment is shown below:

| Formulation V | |
|---|---|
| Potassium Phosphate | 40 weight percent of the dry mixture |
| MgO | 20 weight percent of the dry mixture |
| Silica Compound (i.e. crusshed glass) | 35 weight percent of the dry mixture |
| Tri-calcium Phosphate | 5 weight percent of the dry mixture |

Water is added at between about 15 and 55 weight percent of the dry mixture. Preferably water is added at approximately 25 weight percent of the dry mixture.

In an alternate embodiment silica sand was added to the formulation imparting a harder coating with improved structural qualities.

| Formulation VI | |
|---|---|
| MKP | 20 weight percent of the dry mixture |
| MgO | 10 weight percent of the dry mixture |
| $SiO_2$ | 15 weight percent of the dry mixture |
| $CaSiO_3$ | 5 weight percent of the dry mixture |
| Silica Sand | 50 weight percent of the dry mixture |

Water is added at between about 15 and 55 weight percent of the dry mixture. Preferably water is added at approximately 25 weight percent of the dry mixture.

| Formulation VII | |
|---|---|
| MKP | 20 weight percent of the dry mixture |
| MgO | 20 weight percent of the dry mixture |
| $CaSiO_3$ | 10 weight percent of the dry mixture |
| Crushed Glass | 50 weight percent of the dry mixture |

Water is added at between about 15 and 55 weight percent of the dry mixture. Preferably water is added at approximately 25 weight percent of the dry mixture.

Application of Multi-Purpose/Fire-Retardant Coating

The multi-purpose compositions of the present invention can be applied to substrates by any technique well known in the art including but not limited to: spraying, rolling, brushing, dripping, painting, trolling, and dip coating. Applying the different components of the composition to the substrate in succession can be envisioned. The techniques will vary according to desired results.

The setting time of the slurry will depend on a number of factors including reagent and water temperatures and slurry thickness. The slurry will generally cure faster with increased thickness. High temperature reagents will tend to speed up the slurry reaction and cause it to cure at an increased rate. Curing will result in a fire-resistant coating upon the substrate.

One method of applying the multi-purpose composition generally comprises the following:
   a. applying the invented composition to at least one surface of a substrate
   b. drying the substrate.

The coated substrate can be dried by a myriad of drying means: including but not limited to use of ovens, series of ovens, air drying, and commercial drying equipment.

As noted above the composition can be applied to the surface of the substrate in a variety of ways known in the art including spraying. The slurry components can be mixed prior to spraying, mixed within the spraying apparatus or mixed after exit from the spray nozzle. As noted earlier a salient aspect of the process is the thickness (weight of slurry material/sq. ft) of the coating. In most cases it is preferable to coat the surface in a uniform or near uniform thickness.

A variety of aerating agents can be added to the multi-purpose composition. Suitable aerating agents include but are not limited to: carbonates, bicarbonates, such as calcium carbonate, sodium carbonate, sodium bicarbonate, calcium bicarbonate, starch, baking soda, baking powder, equivalents and combinations thereof.

Like other compositions developed by the instant inventor, the presently present multi-purpose composition, can be used in a variety of ways including but not limited to: a coating, binder, adhesive, cement, mortar, underlayment and patching material. A myriad of aggregates and additives can be added to the composition to create various products including, but not limited to: tile, sculpture, terrazzo, refractories, underlayments, flooring, siding, roofing, countertops, overlayment, patching material, environmental materials, safety tiles, architectural products, building materials, fire-resistant protectants, pervious concrete and cement, toxic and environmental remediation products, panels, and medical and dental applications. Inventor's previous patents and patent applications are hereby incorporated by reference in their entireties, including: U.S. Pat. No. 6,533,821 issued on Mar. 18, 2003, U.S. Pat. No. 6,787,495, issued on Sep. 9, 2004; U.S. patent application Ser. No. 10/685,214 filed on Oct. 14, 2003, U.S. patent application Ser. No. 10/818,268 filed on Apr. 5, 2004.

Exemplary Method of Coating Pipeline or other Substrate
1. Apply at least one layer of CC-100 (or other suitable insulator) to the outside of the pipeline, creating a coated pipeline;
2. Apply at least one layer of Therm-Mack multi-purpose fire-retardant coating on top of the coated pipeline, creating a fire-retardant coated pipeline.

The CC100 and Therm-Mack can be applied in a variety of ways including but not limited to spaying, troweling and other application means known in the art.

CC-100 (or other suitable insulator) can be applied in one or more layers. The layers are generally between about 2-15 mil per layer, although thinner and thicker layers are envisioned. The total thickness of the CC-100 coating is generally greater than about 2 mils, preferably greater than about 5 mils and more preferably between about 10-90 mil although thicker coatings could be employed in extreme temperatures environs.

Therm-Mack, can also be applied in one or more layers. The Therm-Mack coating is generally greater than about $\frac{1}{16}$ inch, preferably greater than about $\frac{1}{8}$ inch and even more preferably between about $\frac{1}{8}$-$\frac{1}{2}$ inch, although thinner and thicker layers are envisioned Although primers are generally not necessary for CC-100 or Therm-Mack, primer coats can be utilized. It should also be noted that addition layers or coatings are envisioned, such coatings could be on either side of the Therm-Mack or CC-100 (or other insulating) layers or in between them.

As noted above, it may be helpful to pause for a period of time in between applying coating layers. In general CC-100 takes about 15 minutes to cure about 10 mils. So a delay between coats of 10-30 minute between layers is appropriate although it can be varied according to conditions.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefor, is not intended to limit the claimed processes to any order except as may be specified in the claims. All ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like refer to ranges which can be subsequently broken down into sub-ranges as discussed above. Accordingly, the invention is limited only by the following claims and equivalents thereto.

All publications and patent documents cited in this application are incorporated by reference in their entirety for all purposes to the same extent as if each individual publication or patent document were so individually denoted.

I claim the following:

1. A method for producing a insulative and fire-retardant substrate, said method comprising the steps of:
    providing a substrate;
    applying at least one layer of an insulative material to the surface of the substrate creating an insulative coating on the substrate, wherein the insulative coating is at least about 5 mils; and
    applying at least one layer of fire-retardant composition to the insulated coating, wherein the fire-retardant layer is at least about 1/16 of an inch thick;
    wherein the fire-retardant composition comprises: a potassium phosphate, MgO; calcium silicate, and crushed glass.

2. The process of claim 1, wherein the fire-retardant composition comprises a mixture of an aqueous solution, a potassium phosphate, MgO, calcium silicate and crushed glass.

3. The process of claim 1, wherein the fire-retardant composition further comprises: a tri-calcium phosphate.

4. The process of claim 1, wherein the insulative coating is between about 10-90 mils.

5. The process of claim 1, wherein the fire-retardant coating is at least about 1/8 of an inch thick.

6. The process of claim 1, wherein the fire-retardant coating is between 1/16th of an inch and 1 inch thick.

7. The process of claim 1, wherein the insulative material is an acrylic polymer mixture.

8. The process of claim 1, wherein the insulative material is CC-100, Therma-Coat or equivalent thereof.

9. The process of claim 1, wherein the substrate is a pipe.

10. The process of claim 1, wherein the substrate is selected from the group consisting of: steel, ferrous metals, non-ferrous metals, woods, gypsums, wood composites, concrete, mortars, synthetics products, paper, carbon composites, foamed polymeric materials and combinations thereof.

11. An insulative and fire-retadardant substrate manufactured using the method of claim 1.

12. A method comprising:
    providing a substrate;
    optionally applying one or more primers or other layers;
    applying at least one layer of an insulative material to the surface of the substrate creating an insulative coating on the substrate, and wherein the insulative coating is at least about 10 mils; and
    applying at least one layer of fire-retardant composition to the insulated coating, wherein the fire-retardant layer is at least about 1/8 of an inch thick;
    wherein the fire-retardant composition comprises: a potassium phosphate, MgO; calcium silicate, and crushed glass, and
    optionally applying one or more additional layers.

13. The method of claim 12 further comprising:
    optionally applying one or more layers between the insulative layer(s) and the multi-purpose layer(s).

* * * * *